A. J. HODGES.

Grain-Headers.

No. 9,040. Reissued Jan. 13, 1880.

Witnesses

Fred. G. Dieterich

B. L. Dieterich

Andrew J. Hodges

Inventor by W. B. Richards

Attorney

N. PETERS, PHOTO-LITHOGRAPHER, WASHINGTON, D. C.

UNITED STATES PATENT OFFICE.

ANDREW J. HODGES, OF PEORIA, ILLINOIS.

GRAIN-HEADER.

SPECIFICATION forming part of Reissued Letters Patent No. 9,040, dated January 13, 1880.

Original No. 183,851, dated October 31, 1876. Application for Reissue filed December 6, 1879.

*To all whom it may concern:*

Be it known that I, ANDREW J. HODGES, of Peoria, in the county of Peoria and State of Illinois, have invented certain new and useful Improvements in Harvesters; and I do hereby declare that the following is a full, clear, and exact description of the invention, that will enable others skilled in the art to which it appertains to make and use the same, reference being had to the accompanying drawings, and to the letters of reference marked thereon, which form a part of this specification, in which—

Figure 1:
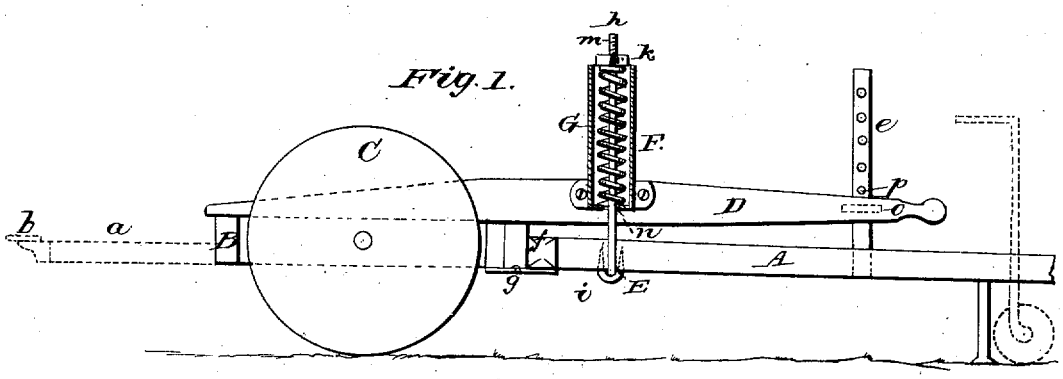
Figure 2:
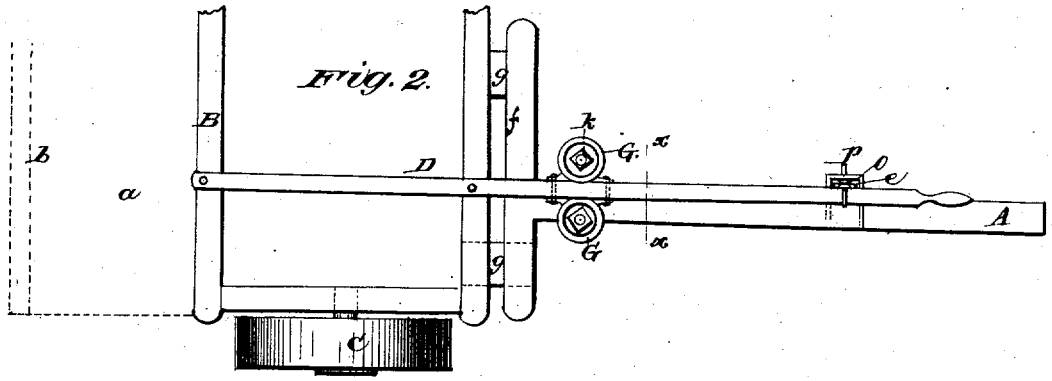
Figure 4:
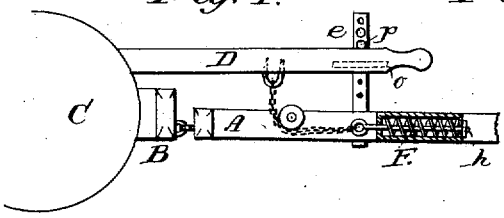
Figure 3:
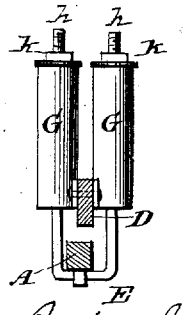

Figure 1 is a side elevation, partly in section, of a machine embodying my invention. Fig. 2 is a top plan. Fig. 3 is a sectional elevation of the parts crossed by the line *x x* in Fig. 2, and a rear-side elevation of the springs. Fig. 4 is a side elevation, showing a modification of the spring.

In harvesters of that class having a main frame supported on wheels and carrying the cutting and grain-conveying apparatus hinged to a draft-pole or thrust-bar, to which the draft-animals are attached, the weight of the grain-platform, augmented by the weight of the grain when the machine is in operation, has a tendency to tilt the forward part of the main frame downward and render it very difficult for the operator to adjust the main frame to regulate the height of the cutting apparatus.

The object of my invention is to overcome the foregoing difficulty and to render it easy for the operator to raise and lower the main frame as required; and to this end my invention consists in an elastic spring-connection between the main frame and thrust-bar or tongue adapted to offer a yielding resistance to the tendency of the forward end of the main frame to tilt downward.

The invention further consists in constructions and combinations hereinafter described, and set forth in the claims hereto annexed.

To accomplish the object of my invention I employ a strong spring or springs as an elastic connection between the main frame and the tongue or its cross-bar. This spring may be formed and applied in various ways; but each should have a provision for the adjustnt or proper balancing of the platform—as, for instance, a nut and thread on a central rod to regulate the tension of the spring.

One of the modes in which I accomplish this object is as follows: I use a strong spring or springs, inclosed in a case or cases, if necessary, the lower end of which spring and the case are attached to the frame-lever. Said spring is coiled around a rod or rods, which are jointed to the tongue or thrust-bar of the machine. The upper end of the spring or springs abut against a nut or nuts at the free end of the rod, said spring being attached below either to the said lever or to a fixed point within the case. This elastic connection between the tongue and the lever may be equally well managed by reversing the mode of attaching the spring—viz., attaching the spring or springs to the tongue and the rod or rods passing through the spring or springs to the lever.

Another form in which I use the spring and attach it is by using a chain or rope, with or without the central rod, running from the spring attached to one of the mentioned parts of the machine to the other, as shown at Fig. 4, the chain being passed around a pulley or friction-roller. This form and those described before do not contemplate the doing away with the usual adjusting-bar *e*. This may or may not be used as an aid in staying, steadying, and equalizing the motion and adjusting the balance between the frame and tongue.

In the drawings, which represent one of the forms in which I construct this device, A represents the tongue, bearing the usual adjusting-bar *e* and cross-bar *f* next to the frame B, which frame B is connected with the tongue A by a hinge-joint, *g*. C C are the supporting-wheels; *a*, the grain-platform; *b*, the sickle, and D the frame-adjusting lever.

E represents a double or bent rod, having parallel upright arms *h h* on either side of the lever D, and hinged or pivoted at its lower end to the tongue A by a staple or eye, *i*, so as to oscillate freely forward and backward in following the motion of the lever D. F F are strong spiral springs coiled one around each of the arms *h* of the rod E. The lower end of each spring F abuts against a shoulder, *n*, at the bottom of its respective inclosing-case G, which cases G are attached by means of lugs and bolts one to each side of the lever D.

The upper ends of the springs F abut respectively against nuts or thumb-screws *k*, which are screwed onto the upper threaded ends of the rod-arms *h* near the mouth of each case G.

In operation, the nuts *k* may be adjusted on the rods *h* to regulate the tension of the springs F so as to counterbalance the weight of the forward platform, *a*, and so as to offer a yielding resistance to the tendency of the forward end of the main frame to tilt or turn downwardly by its weight, and by the action of uneven surface of ground, and by irregular motion of the draft-animals. The springs place the action of the frame *a* B well under the control of the operator and prevent forcible upward movement of the lever D. The end of the lever D is adjusted, as usual, to the detent-post *e*, to limit the strain on the springs by limiting the extent of the oscillations of the lever D.

What I claim as new, and desire to secure by Letters Patent, is—

1. In a harvesting-machine, the combination, with a main frame supported on wheels and carrying the cutting apparatus and grain-platform, and with a tongue or thrust-bar hinged to said main frame, of a spring located between the main frame and thrust-bar, and adapted to exert a yielding resistance to the tendency of the forward end of the main frame to tilt downwardly.

2. A spring or springs, in combination with and as a connection between the thrust-bar and the frame-lever of a harvesting-machine, for the purpose of preventing violent oscillation of said frame-lever by the downward tilting of the forward part of the frame, to which said frame-lever is attached, and to otherwise steady the motions of said frame-lever.

3. In a harvesting-machine, the combination, with the main frame and tongue or thrust-bar, of a spring or springs adjustable in tension to adapt them to counterbalance the weighted forward end of the main frame, substantially as and for the purpose specified.

4. The combination, with the main frame having a projecting lever, D, and the tongue A of a harvesting-machine, of the springs F, forked rod E, cases G, and nuts *k*, substantially as and for the purpose specified.

In testimony that I claim the foregoing I have hereunto set my hand this 25th day of November, 1879.

ANDREW J. HODGES.

Witnesses:
ABIAL B. SAWYER,
C. G. VANOSTRAND.